United States Patent [19]
Williams

[11] Patent Number: 5,497,581
[45] Date of Patent: Mar. 12, 1996

[54] AUDIBLE FISHING LURE

[76] Inventor: Victor N. Williams, 2913 Peregoy Dr., Kensington, Md. 20895

[21] Appl. No.: 333,314

[22] Filed: Nov. 1, 1994

[51] Int. Cl.⁶ ............................................. A01K 85/00
[52] U.S. Cl. .................................. 43/42.31; 43/42.46
[58] Field of Search ......................... 43/42.31, 42.2, 43/42.16, 42.21, 42.46, 42.35; 446/418, 420, 421

[56] References Cited

U.S. PATENT DOCUMENTS

| | | | |
|---|---|---|---|
| 2,077,311 | 4/1937 | Darby | 43/42.2 |
| 2,594,981 | 4/1952 | Ohlund et al. | 43/42.2 |
| 2,833,078 | 5/1958 | Peltz | 43/42.31 |
| 2,853,826 | 9/1958 | Romeo | 43/42.31 |
| 2,881,548 | 4/1959 | Backe | 43/42.31 |
| 2,977,705 | 4/1961 | Busnel | 43/42.31 |
| 2,999,329 | 9/1961 | Pankuch | 43/42.31 |
| 3,000,130 | 9/1961 | Pankuch | 43/42.31 |
| 3,035,367 | 5/1962 | Troyer | 43/42.2 |

Primary Examiner—P. Austin Bradley
Assistant Examiner—James Miner

[57] ABSTRACT

A fishing lure or buzz bait which includes a hollow body having an amplifying or resonating chamber in which sound is produced and amplified. The outer surface of the body has fins which agitate the water and produce additional sounds as the body moves through the water. The combination of sounds is attractive to fish.

6 Claims, 1 Drawing Sheet

AUDIBLE FISHING LURE

This invention relates to a new and improved fishing lure. More particularly, it relates to an inexpensive audible fishing lure which can be used alone as a buzz bait or in conjunction with other lures.

BACKGROUND

There has long been a need for an inexpensive, audible, gyrating fishing lure, which can be used in conjunction with other lures or alone as a buzz bait type bait. Through alteration of acoustics and intermittent vibration, fish hear, as well as sense, and are allured to the device with pinpoint accuracy. An improved rattle emitting chamber serves to resonate or intensify the sound. The frequency of sound can be varied by different retrieval speeds of the lure. The lure will also spray, splash, and leave a trail of popping bubbles, which collectively contribute to the lure's fascination and sight related fish attraction abilities.

THE INVENTION

There are numerous recent U.S. patents on sound producing fishing lures, including the following:

| Trout | 2,737,749 | issued | March 13, 1956 |
| Peltz | 2,833,078 | issued | May 6, 1958 |
| Romeo | 2,853,826 | issued | September 30, 1958 |
| Backe | 2,881,548 | issued | April 14, 1959 |
| Pankuch | 2,999,329 | issued | September 12, 1961 |
| Pankuch | 3,000,130 | issued | September 19, 1961 |
| McLean | 3,296,733 | issued | January 10, 1967 |
| and Fairbanks | 3,909,973 | issued | October 7, 1973 |

The present invention is an improvement over the above noted prior art patents in the provision of a fishing lure which includes a hollow body having a resonating chamber in which sound is produced and amplified and on the outer surface of which are means for agitating the water and producing bubbles and additional sounds which reinforce the attraction of the lure.

OBJECTS

One object of the invention is to provide a sound producing fishing lure in which the lure includes a hollow body with sound producing means on both its inner surface and its outer surface.

Another object is to provide an improved sound producing fishing lure which can be used alone as a buzz bait or can be used with other lures.

THE DRAWINGS

These and other objects and advantages of the invention will become apparent from the description which follows taken in conjunction with the drawings in which.

DESCRIPTION

Figure 1:
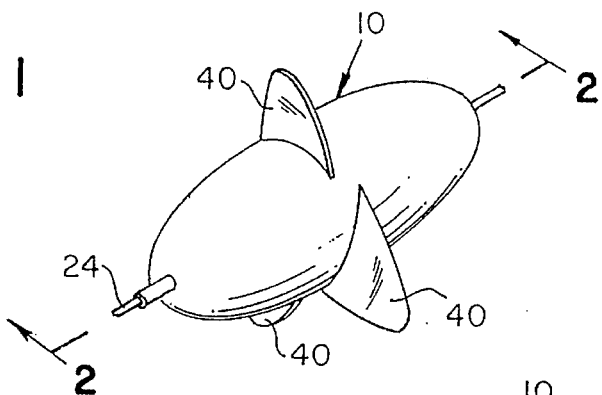
FIG. 1, is a perspective view of the sound producing fishing lure of this invention.
Figure 2:
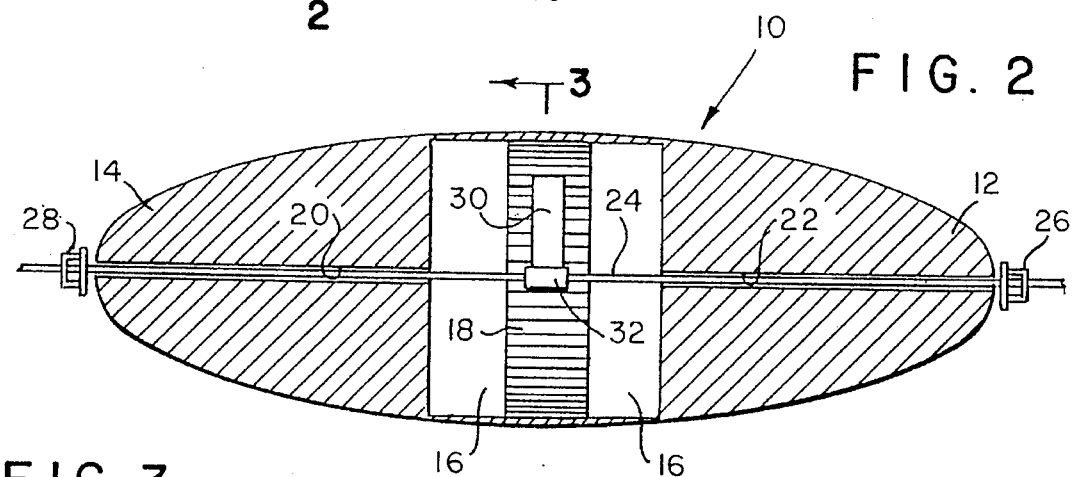
FIG. 2, is a section taken in plane 2—2 of FIG. 1.
Figure 3:
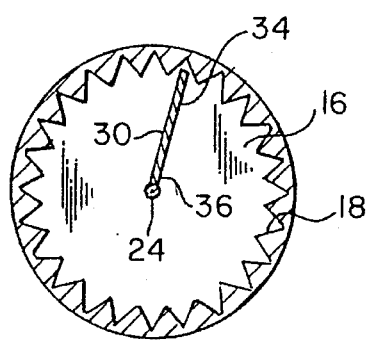
FIG. 3 is a section taken in plane 3—3 of FIG. 2.
Figure 4:
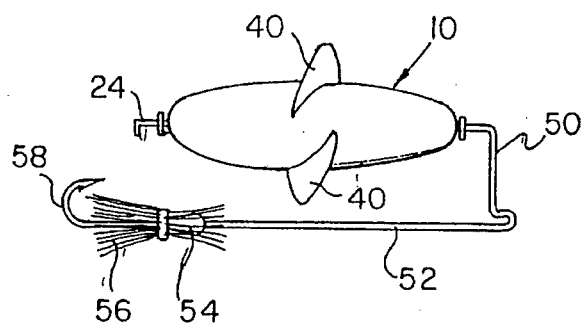
FIG. 4, is a view showing the lure of FIG. 1 in conjunction with a conventional lure.
Figure 5:
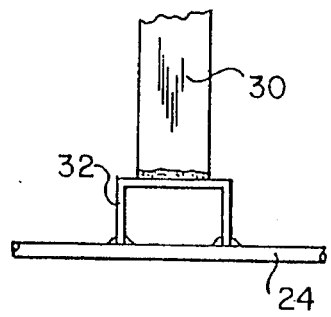
FIGS. 5 and 6 illustrate the attachment of the principal sound producing means to a supporting shaft.
Figure 6:
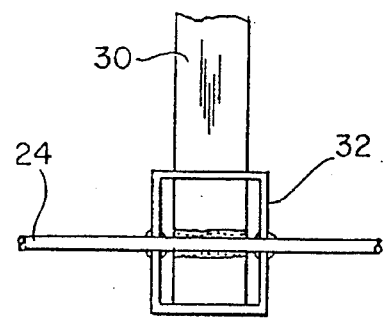

As best seen in FIG. 1 the lure of this invention comprises a body 10 with a generally torpedo shape. Body 10 has a solid nose portion 12 at the forward end and a solid tail portion 14 at the aft end. Preferably, the nose portion 12 and the tail portion 14 are symmetrical. Body 10 has a hollow interior cavity 16 between the solid nose 12 and the solid tail 14. A portion of the surface of cavity 16 is provided with teeth or serrations 18. Nose 12 has a bore 20 extending from the exterior of body 10 to cavity 16. Tail 14 has a bore 22 extending from the exterior of body 10 to cavity 16. Bores 20 and 22 are aligned to receive a shaft 24 which supports body 10 when it is immersed in a river, creek, bay or other body of water being fished. Stops 26 and 28 on shaft 24 serve to locate body 10 along shaft 24.

Shaft 24 also supports a sound producing reed 30 of spring steel which is secured to shaft 24 by welding it to a reinforcement comprised of a wire frame 32 welded to shaft 24. Reed 30 has one end 36 attached to reinforcement 32 secured to shaft 24 and a free end 34 which strikes serrations 18 when body 10 rotates.

On the exterior surface of body 10 are three fins 40 symmetrically disposed around the circumference of body 10. Fins 40 may be located anywhere along body 10. Preferably, they are midway between nose 12 and tail 14. Fins 40 are shaped like the blades on a propeller so that they cause body 10 to rotate on shaft 24 as the lure is pulled through the water. Propeller shaped fins 40 agitate the water and produce a stream of bubbles which rise to the surface as they advance through the water. The production of bubbles produces a gurgling sound which supplements the sound produced by reed 30 as it rides over teeth or serrations 18. Body 10 including fins 40 and serrations 18 is preferably produced by injection molding a synthetic resin and may if desired consist of a foamed resin to make the body buoyant.

The lure of this invention may be used with other devices commonly used by fishermen. As shown in the Figures, body 10 is on a wire shaft 24. Stops 26 and 28 on shaft 24 are spaced from nose 12 and tail 14 to permit body 10 to rotate freely on shaft 24. The wire of shaft 24 is bent to provide a downwardly extending leg 50 and an axially extending portion 52 generally parallel to shaft 24. A lead head 54 and debbie or hula skin 56 are supported on the lower reach 52 of wire 24. A hook 58 is carried at the free end of wire 52.

It will be seen that as body 10 moves through the water, when pulled by a line (not shown), body 10 rotates and fins 40 agitate the water and produce one sound and serrations 18 rotate and the free end 34 of reed 30 strikes serrations 18 and produces another sound. The combination of sounds is particularly attractive to fish.

Having now described a preferred embodiment of my invention it is not intended that it be limited except as may be required by the appended claims

I claim:

1. In a fishing lure:

a rotatable torpedo shaped hollow body having a front end and rear end;

a solid nose portion and a solid tail portion at the from end and rear end of said body respectively;

a cavity in said hollow body between said nose portion and said tail portion, which serves as a chamber for the amplification of sound;

an exterior surface on said body;

a plurality of fins on the exterior surface of said body each having a shape which agitates and produces a stream of bubbles as it advances through a body of water;

a bore in the solid nose and a bore in the solid tail of said body extending from the exterior of said body to said cavity;

a shaft passing through said bores supporting said body for rotation, an interior surface in said body defining said cavity;

serrations or teeth on a portion of the interior surface of said chamber, and a striker mounted on said shaft, adapted to produce sound when it strikes the teeth on the walls of said chamber as said body rotates, whereby fish are attracted to said body by a combination of sounds produced by sounding means inside said hollow body and by sounding means on the exterior surface of said hollow body.

2. The fishing lure of claim 1 including a reinforcement attached to said shaft, said striker being attached to said reinforcement.

3. The fishing lure of claim 1 wherein said body is an injection molded resin.

4. The fishing lure of claim 3 wherein the resin is foamed.

5. The sound producing fishing lure of claim 1 used with a non audible lure.

6. The fishing lure of claim 1 as a buzz bait.

* * * * *